United States Patent [19]

Toback et al.

[11] Patent Number: 5,304,023
[45] Date of Patent: Apr. 19, 1994

[54] METAL PANEL FASTENER

[75] Inventors: Alex S. Toback, West Hartford, Conn.; Stanley W. Choiniere, Southwick, Mass.

[73] Assignee: Metaltite Corporation, West Hartford, Conn.

[21] Appl. No.: 965,238

[22] Filed: Oct. 23, 1992

[51] Int. Cl.$^5$ .............................................. F16B 25/00
[52] U.S. Cl. .................................. 411/387; 411/414; 411/914
[58] Field of Search ............... 411/387, 914, 915, 368, 411/414, 423, 82, 258, 403; 52/410, 509, 512

[56] References Cited

U.S. PATENT DOCUMENTS

| | | | |
|---|---|---|---|
| 2,380,724 | 7/1945 | Crooks | 411/414 |
| 3,022,197 | 2/1962 | Jedlicka | 411/914 X |
| 3,578,762 | 5/1971 | Siebol | 411/387 |
| 3,639,137 | 2/1972 | Marinelli | 411/914 X |
| 3,869,219 | 3/1975 | Wilson et al. | 411/387 X |
| 3,882,752 | 5/1975 | Gutshall | 411/387 X |
| 4,003,175 | 1/1977 | Patry | 411/387 X |
| 4,642,011 | 2/1987 | Uramoto et al. | 411/914 X |
| 4,652,194 | 3/1987 | Tajima et al. | 411/414 X |
| 4,657,460 | 4/1987 | Bien | 411/915 X |
| 4,730,970 | 3/1988 | Hyner et al. | 411/387 |
| 4,900,208 | 2/1990 | Kaiser et al. | 411/387 |
| 4,907,926 | 3/1990 | Wing | 411/414 X |
| 5,100,274 | 3/1992 | Hasan et al. | 411/368 |

FOREIGN PATENT DOCUMENTS

| | | | |
|---|---|---|---|
| 2491563 | 4/1982 | France | 411/387 |
| 194042 | 1/1965 | Sweden | 411/423 |
| 2159745 | 12/1985 | United Kingdom | 411/387 |

Primary Examiner—Peter M. Cuomo
Assistant Examiner—Suzanne L. Dino
Attorney, Agent, or Firm—Chilton, Alix & Van Kirk

[57] ABSTRACT

A fastener for fastening a pair of metal panels comprises a head which has an annular recess at its underside. A threaded shank has a buttress thread which terminates in a self-driving tip. An sealant/adhesive coating is preapplied to the fastener. The coating seals and bonds between the fastener and the panels upon installation of the fastener.

23 Claims, 2 Drawing Sheets

METAL PANEL FASTENER

BACKGROUND OF THE INVENTION

This invention relates generally to fasteners which are employed to fasten metal panels such as sheet metal. More particularly, the present invention relates to fasteners which are employed for fastening panel roofs.

Roofing systems for metal buildings frequently employ metal roofs comprising corrugated or trapezoidal metal panels which are fastened by conventional "sheet metal fasteners". A roofing composition is then applied to the panels to provide a water barrier. While conventional metal roof systems have proved to perform satisfactorily over time, it is indisputable that metal roofs do have a significant failure rate. A principal source of failure occurs when the fasteners loosen. If there is poor drainage or the seam seals fail, moisture may migrate to the vicinity of the fastener opening. The moisture may then lead to corrosion which eventually may attain a magnitude that jeopardizes the integrity of the roof system. A number of metal roof coating systems have been introduced to compensate for the failure problems of the conventional metal roof by enhancing the water barrier system of the roof. However, fastener failure remains a significant problem if there is inadequate roof securement.

In typical metal roof construction, the metal panels are secured by numerous sheet metal fasteners. The sheet metal fasteners are conventionally self-drilling threaded fasteners which in tandem with a washer are driven by torque guns into the metal supports. The fasteners are typically installed from on top of the roof panel in a routine labor intensive process. The panels will eventually tend to move or slide due to structural settling and also due to environmental factors such as wide temperature differentials, intense heat, winds, and the impact of rain and snow including their collection onto the roof structure. The sliding-type movements of the panels tend to force the fasteners sideways and eventually upwardly out of locking relationship. The immediate vicinity of the panel surrounding the fastener opening which is exposed by the loosened fastener becomes a source of collection of moisture and ultimately a source of corrosion, so that the fastener provides no securement function whatsoever. If fastener failure becomes excessive, the roof system will essentially fail and repair or replacement will be required.

SUMMARY OF THE INVENTION

Briefly stated, the invention in a preferred form is a fastener for fastening a pair of metal panels. The fastener comprises a head having an underside which includes a recess. The head may have a rounded or hex head-type configuration including an integral washer or flange extending radially therefrom. The recess extends axially from the underside of the head with the recess surrounding the proximal head portion. The shank is traversed by a spiral buttress thread. The support surface of the buttress thread is oriented at an angle between 0 degrees and 15 degrees to a normal line to the axis of the shank. The second driving surface which defines the buttress thread is inclined to the normal line at an angle between 25 degrees and 65 degrees. The distal tip of the shank includes a self-drilling configuration for drilling into the metal panel, such as a dual fluted drill tip-type arrangement.

A sealant and/or adhesive coating may be applied to the upper portion of the shank and the recess. The coating is pre-applied to the fastener and assumes a stable, solid form. Upon installation of the fastener, the coating functions to seal against the upper threads and the upper underside of the head and also functions as an adhesive. In a preferred form, the coating may be an adhesive which is composed of a two part epoxy or other adhesive system. The coating may also be a sealant having a silicone, wax, urethane, neoprene or butyl rubber composition. Alternately, a sealant washer may be prepositioned at the recess for sealing against the underside of the head and the metal panel.

When the fastener is driven through a pair of metal panels, the support surface of the buttress thread engages the underside of the bottom panel and the head is forced downwardly toward the top surface of the upper panel thereby mechanically locking the panels together. In addition, the sealant/adhesive is distributed so that a bonded sealing engagement is provided between the fastener head and the top of the metal panel, and in addition, a bonded sealing engagement is provided between the upper threaded portion of the shank and the adjacent threadably engaged panel.

An object of the invention is to provide a new and improved fastener for securing a metal panel.

Another object of the invention is to provide a new and improved fastener for a metal panel which implements both an enhanced mechanical lock and an improved bond and seal engagement with the panels.

A further object of the invention is to provide a new and improved system for fastening a metal roof.

Other objects and advantages of the invention will become apparent from the drawings and the specification.

DETAILED DESCRIPTION OF THE PREFERRED EMBODIMENT

Figure 6:
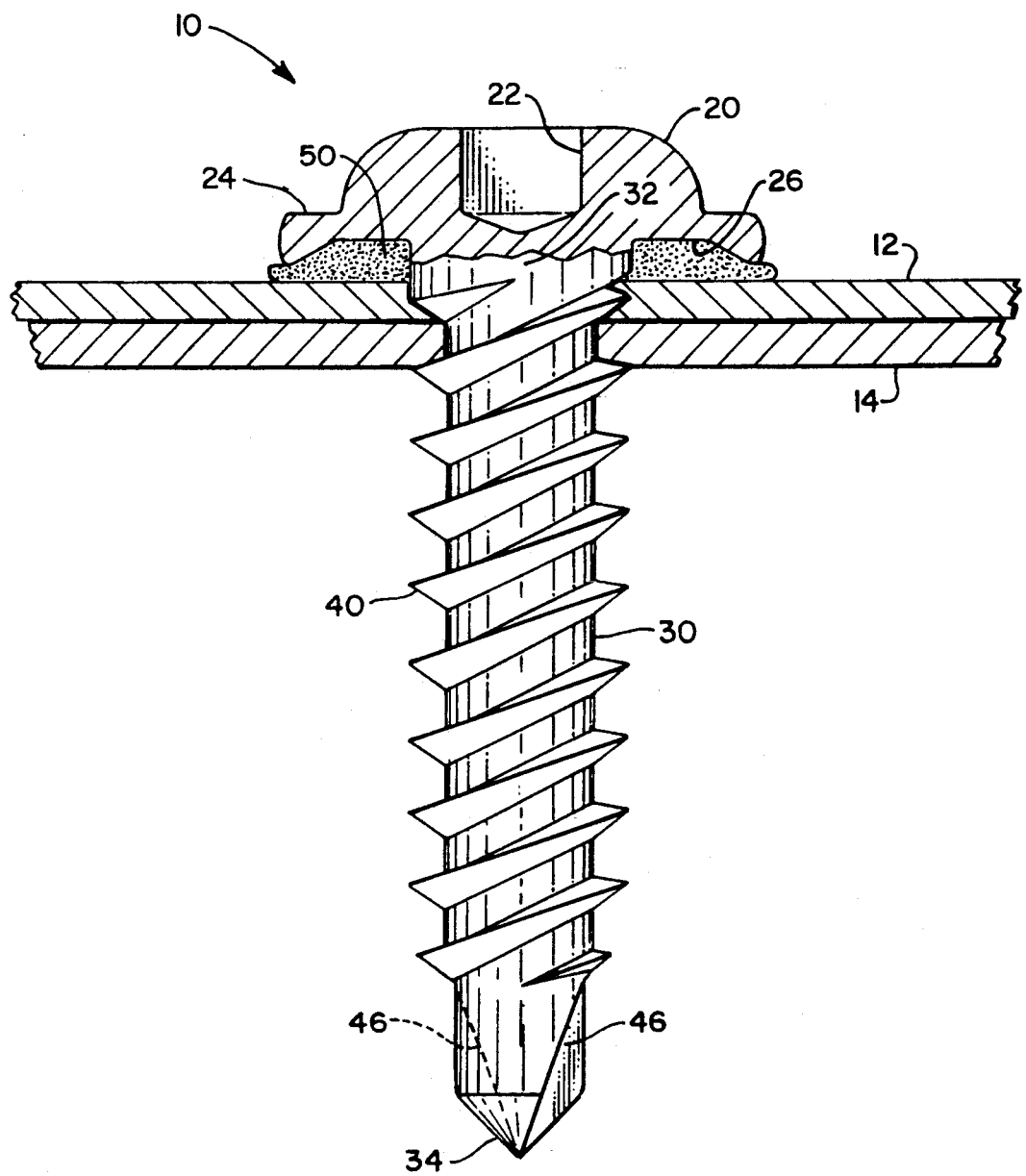
FIG. 6 is a side elevational view of the metal panel fastener of FIG. 1 illustrated in an installed configuration fastening a pair of metal panels, portions of which are illustrated in section.

With reference to the drawings wherein like numerals represent like parts throughout the figures, a metal panel fastener in accordance with the invention is generally designated by the numeral 10. Fastener 10 is adapted for securing a metal panel 12 to a second metal panel 14 or a support structure such as illustrated in FIG. 6. The fastener 10 is particularly applicable for fastening metal roof panels, but also is readily applicable for use with fastening metal panels in general, such as metal panels of a wall, a trailer or an appliance.

Figure 1:
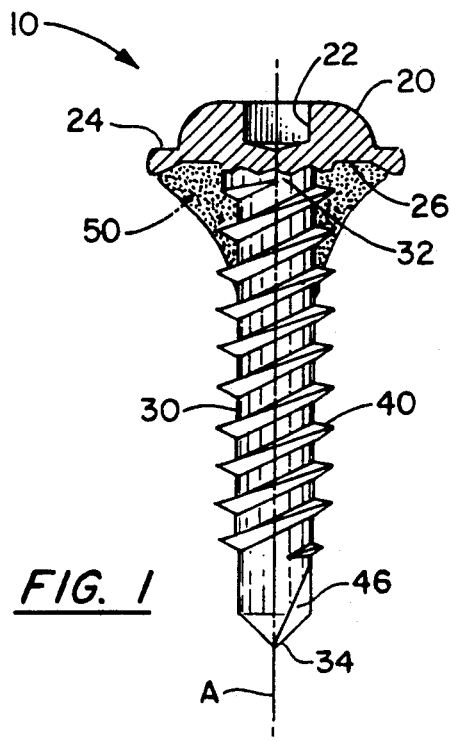
FIG. 1 is a side elevational view, partly in schematic, of a metal panel fastener in accordance with the present invention.
Figure 2:
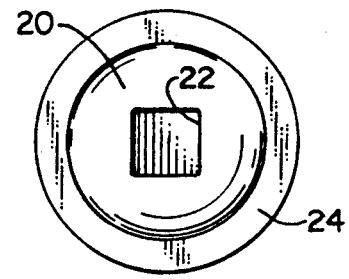
FIG. 2 is a top plan view of the fastener of FIG. 1.
Figure 3:
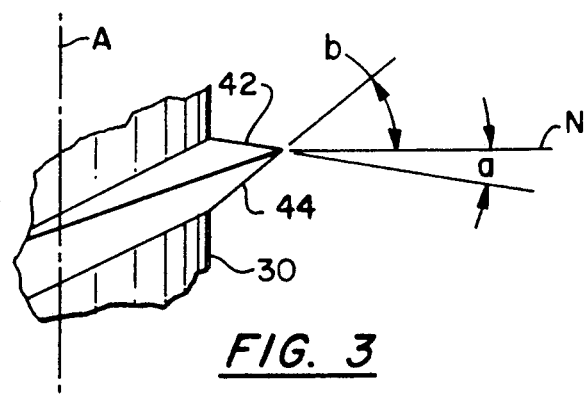
FIG. 3 is an enlarged fragmentary view, partly in schematic, of a portion of the thread of the fastener of FIG. 1.

With reference to FIG. 1, fastener 10 includes a head 20 which has a square socket 22 for receiving a complementary driver of a pneumatic or electric torque gun (not illustrated). The head has a underside portion which includes an integral circumferential flange or washer 24. The underside of the head further includes an annular recess 26.

Figure 4:
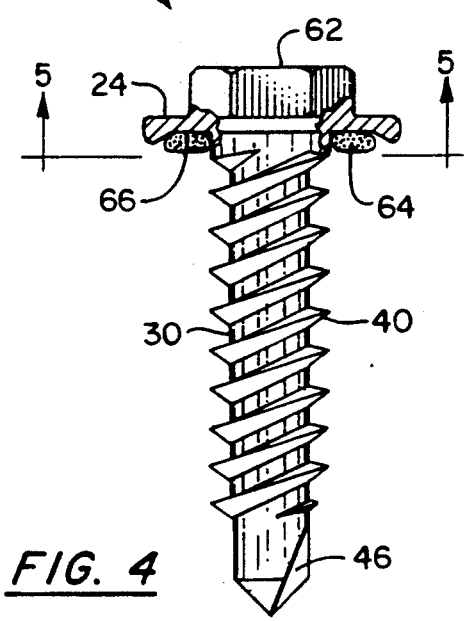
FIG. 4 is a side elevational view of a second embodiment of a metal panel fastener in accordance with the present invention.

A shank 30 integrally extends at its proximal end 32 from the underside of the head. The annular recess 26 surrounds the proximal end of the shank. The shank terminates in a tapered distal tip 34. The shank 30 is traversed by a buttress thread 40 which extends from approximately the proximal end 32 and terminates in tapered fashion near the distal end. With reference to FIG. 4, the buttress thread 40 includes a support surface 42 and a driving surface 44. In a preferred form, the support surface 42 is oriented at an angle of approximately 10 degrees to a normal line N to the central axis A of the shank. Preferably, the angle a between normal line N and the support surface 42 is between 0 degrees and 15 degrees. The driving surface 44 is preferably oriented at an angle of approximately 35 degrees a normal line N to the shank axis A. In preferred form, the angle of b between the normal line N and the driving surface 44 is between 25 degrees and 65 degrees.

The distal portion of the shank terminates in a pair of fluted slots 46 which are structured to provide a drill tip for self-drilling into the metal panel. The distal portion may also be configured for self-piercing into the metal panels. The thread configuration provides for self-tapping. The slots 46 are oriented at an angle of approximately 26 degrees to the axis A of the shank.

Dimensions for two examples of the fastener 10 which are manufactured from steel and heat treated are set forth in the table below (dimensions in inches):

| shank length | 0.750 | 1.00 |
| --- | --- | --- |
| root diameter | .148 | .152 |
| thread diameter | .230 | .235 |
| tip diameter | .125 | .134 |
| washer diameter | .530 | .540 |

A coating 50 of a sealant and/or an adhesive is preapplied to the underside of the head and the top of the threaded shank. The coating extends into the recess 26. The coating 50 is applied in a form which results in a tapered quasi-conical mass as best illustrated in FIG. 1. A sealant form of the coating 50 may be a composition such as a silicone, wax, urethane, neoprene or butyl rubber composition. A sealant adhesive form of the coating 50 may be a two part epoxy system which has an ultraviolet cured skin. The coating 50 may be sprayed, dripped on or contact applied.

The sealant/adhesive coating 50 has properties and is applied to the fastener so that the coating does not significantly increase the resistance to driving when the fastener is installed and provides a good adhesion to the thread when the adhesive is in an uncured state. The coating 50 cures outside of the joint provided by the fastener under the fastener head and has good adhesion to painted surfaces and to threads upon curing. The cured adhesive is flexible enough to withstand movement of the fastener panel joint whether due to environmental forces such as temperature changes or settling that will occur in the structure. The coating 50 upon curing preferably provides an adhesive-type bond which is capable of curing in ambient temperatures.

Figure 5:
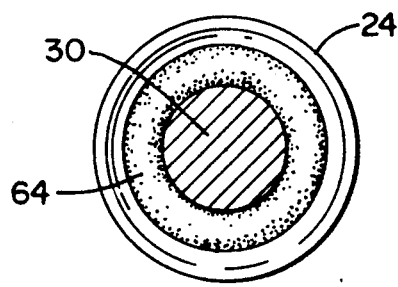
FIG. 5 is a sectional view of the fastener of FIG. 4 taken along the line 5—5 thereof.

With reference to FIGS. 4 and 5, a second embodiment of a fastener 60 has a hex head 62 and is otherwise similar to fastener 10 except that a nylon gasket or other deformable plastic gasket 64 is pressed into the annular recess 66 at the underside of the head. In this embodiment, the sealant/adhesive coating 50 is not applied to the fastener although it may optionally be applied as described above. The gasket 64 is compressed upon installation of the fastener and seals between the fastener head and the panel.

With reference to FIG. 6, the installed fastener 10 is illustrated in an installed position for securing together two panels 12, 14. It should be appreciated that the upper portions of the support surface 42 of the buttress thread 40 provides a ledge for locking the upper sheet metal panel 12 and the support panel 14. The sealant/adhesive coating 50 is forced into intimate relationship between the underside of the washer 24 and the head and the top surface of the panel to provide for an effective seal as well as a bonding between the head and the panel. In addition, the coating 50 provides a sealing and a bonding between the upper proximal portions of the thread shank and the adjacent threaded opening portions of the panels. During the natural course of installation, it is not uncommon for fasteners to immediately strip from the metal substrate. The adhesive will positively lock and seal the fastener to the metal panels even if fastener stripping should occur.

While the fastener may be installed by conventional installation techniques, it should be appreciated that fasteners 10, 60 provide both a superior mechanical lock as well as a superior seal and bonding relationship between the panels than is provided by the heretofore described conventional sheet metal fasteners. The combination of the buttress thread and the drill tip enhances the resistance of the fastener to turn-out.

It will be appreciated that the head of the fastener alternately may be configured in a round head configuration having a slot for a driver blade or any other conventional fastener head configurations.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fastener for fastening a pair of metal panels comprising:

head means comprising a top portion and an underside and recess means for defining a recess at said underside; and shank means integrally extending from said underside at a proximal end and terminating at a distal tip and defining an axis thereof, said recess surrounding said shank means at said proximal end, said shank means having a spiral buttress thread extending from a location adjacent said proximal end and defining a first support surface which is oriented at an angle between 0 degrees and 15 degrees to a normal line to the axis of said shank and a second surface which is inclined to said normal line at an angle between 25 and 65 degrees, said shank means comprising self-drilling means adjacent said distal tip for self-drilling into a metal panel, whereby said buttress thread is engageable against said metal panels to clamp said metal panels against said head means.

2. The fastener of claim 1 wherein said head defines a square socket at the top portion thereof.

3. The fastener of claim 1 wherein an integral flange radially extends at the underside of said head means.

4. The fastener of claim 1 wherein said self-drilling means further comprises a dual fluted slot configuration.

5. The fastener of claim 1 wherein said distal tip is configured in a self-piercing point.

6. The fastener of claim 1 wherein said support surface angle is 10 degrees.

7. The fastener of claim 1 wherein said second surface angle is 35 degrees.

8. The fastener of claim 1 further comprising a coating affixed at the underside of said head means and the proximal portions of said shank means.

9. The fastener of claim 8 wherein said coating is a sealant/adhesive composition.

10. The fastener of claim 9 wherein said coating is an epoxy.

11. The fastener of claim 8 wherein said coating is a sealant selected from the group consisting of a silicone, wax, urethane, neoprene and butyl rubber composition.

12. The fastener of claim 1 further comprising a compressible sealant gasket disposed in said recess.

13. The fastener of claim 1 wherein said recess has a substantially annular shape.

14. The fastener of claim 1 wherein said buttress thread has a root diameter and said self-drilling means is located at a self-drilling portion of said shank, said self-drilling portion having a diameter which is less than the root diameter of said buttress thread.

15. A metal panel assembly comprising:
a first metal panel having a first opening;
a second metal panel having a second opening aligned with said first opening and overlaying said first panel;
fastener means for fastening said panels together comprising:
head means having a top portion and an underside disposed adjacent one said panel and recess means for defining a recess at said underside;
shank means defining a central axis and extending from said underside through said opening and terminating in a tapered distal tip, said shank means having a spiral buttress thread extending from a location adjacent said proximal end and comprising a support surface which is oriented at an angle between 0 degrees and 15 degrees relative to said axis wherein a portion of said support surface engages the other said panel; and
a coating disposed between said head and said one panel and between said shank and adjacent portion of the first and second panels,
so that said panels are locked together between said head means and engaging portions of said buttress thread, and said coating seals between said head means and said one panel and portions of said first and second panels surrounding said shank means.

16. The assembly of claim 15 wherein said recess is annular and said coating is disposed in said recess.

17. The assembly of claim 15 wherein said coating is an epoxy.

18. The assembly of claim 15 wherein said coating is a sealant selected from the group consisting of a silicone, wax, urethane, neoprene or butyl rubber composition.

19. The metal panel assembly of claim 15 wherein said buttress thread has a root diameter and said self-drilling means is located at a self-drilling portion of said shank, said self-drilling portion having a diameter which is less than the root diameter of said buttress thread.

20. A fastener for fastening a pair of metal panels comprising:
head means comprising a top portion and an underside and recess means for defining an annular recess at said underside;
shank means integrally extending from said underside at a proximal end and terminating at a distal tip and defining an axis thereof, said recess surrounding said shank means at said proximal end, said shank means having a spiral buttress thread extending from a location adjacent said proximal end said spiral buttress thread having a support surface inclined at an angle between 0 degrees and 15 degrees to a normal line to said axis;
self-drilling means adjacent said distal tip for self-drilling into a metal panel; and
coating means for sealing between said fastener and said panels comprising a sealant composition disposed in said recess and engaging said shank means proximate said proximal end, whereby said buttress thread is engageable against said metal panels to clamp said metal panels against said head means.

21. The fastener of claim 20 wherein an integral flange radially extends at the underside of said head means.

22. The fastener of claim 20 wherein said composition comprises a two part epoxy.

23. The fastener of claim 20 wherein said composition is a sealant selected from the group consisting of a silicone, wax, urethane, neoprene and butyl rubber composition.

* * * * *